A. T. DAWSON & G. T. BUCKHAM.
FIREARM.
APPLICATION FILED MAY 13, 1913.
1,077,873.
Patented Nov. 4, 1913.
6 SHEETS—SHEET 1.
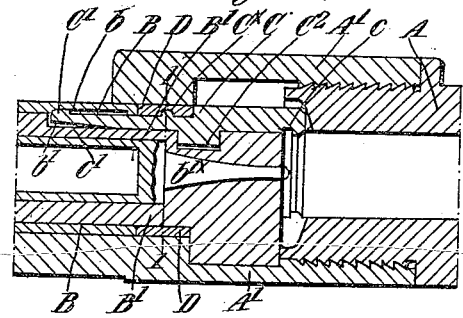
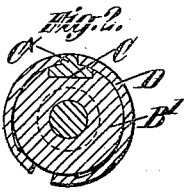
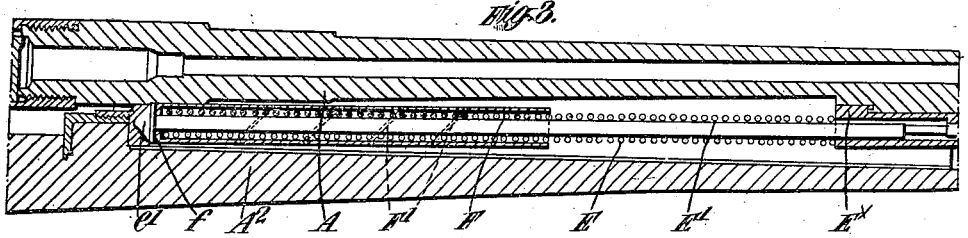
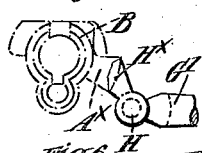
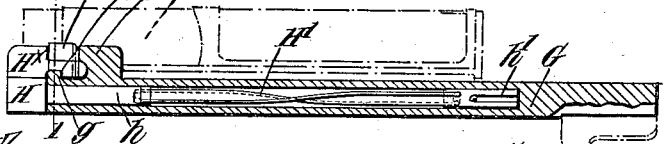
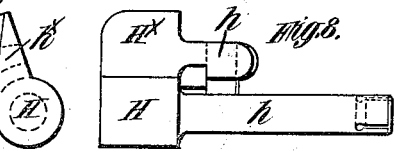
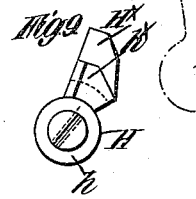
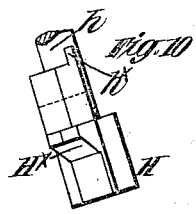
Witnesses:
H. M. Lewis
C. B. Schroeder
Inventors:
Arthor Trevor Dawson
& George Thomas Buckham
By Pennie Davis & Goodenough
Attys.

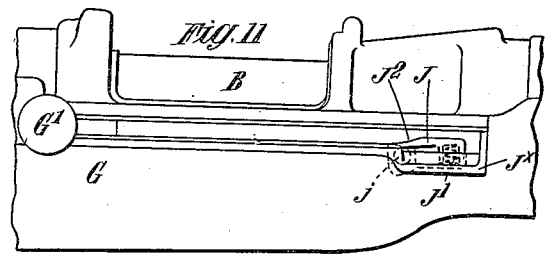
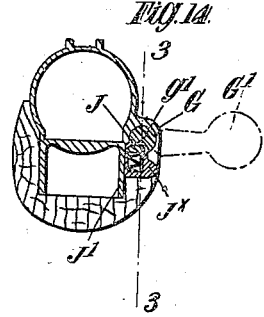
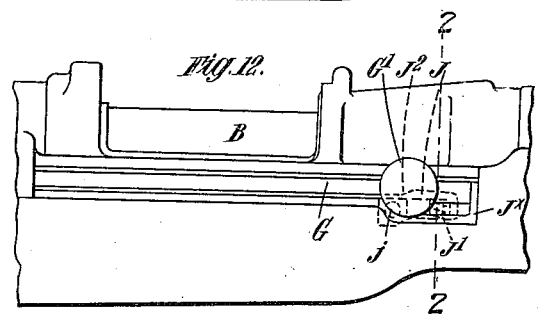
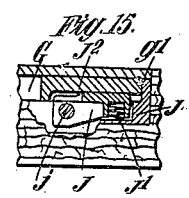
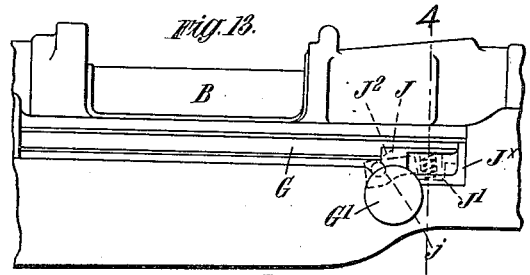
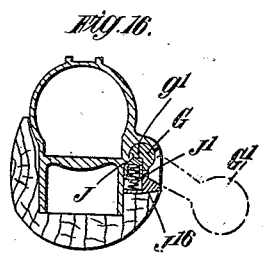
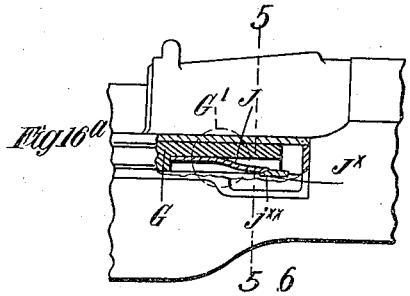
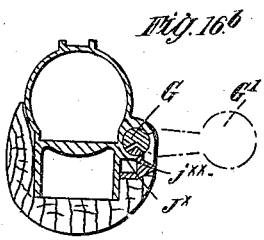
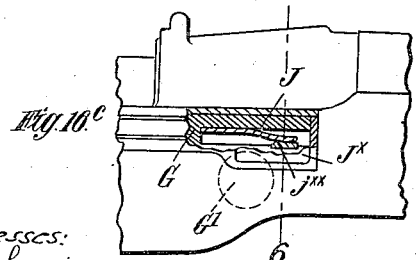
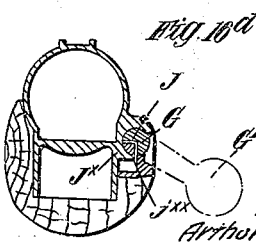

A. T. DAWSON & G. T. BUCKHAM.
FIREARM.
APPLICATION FILED MAY 13, 1913.
1,077,873.
Patented Nov. 4, 1913.
6 SHEETS—SHEET 3.
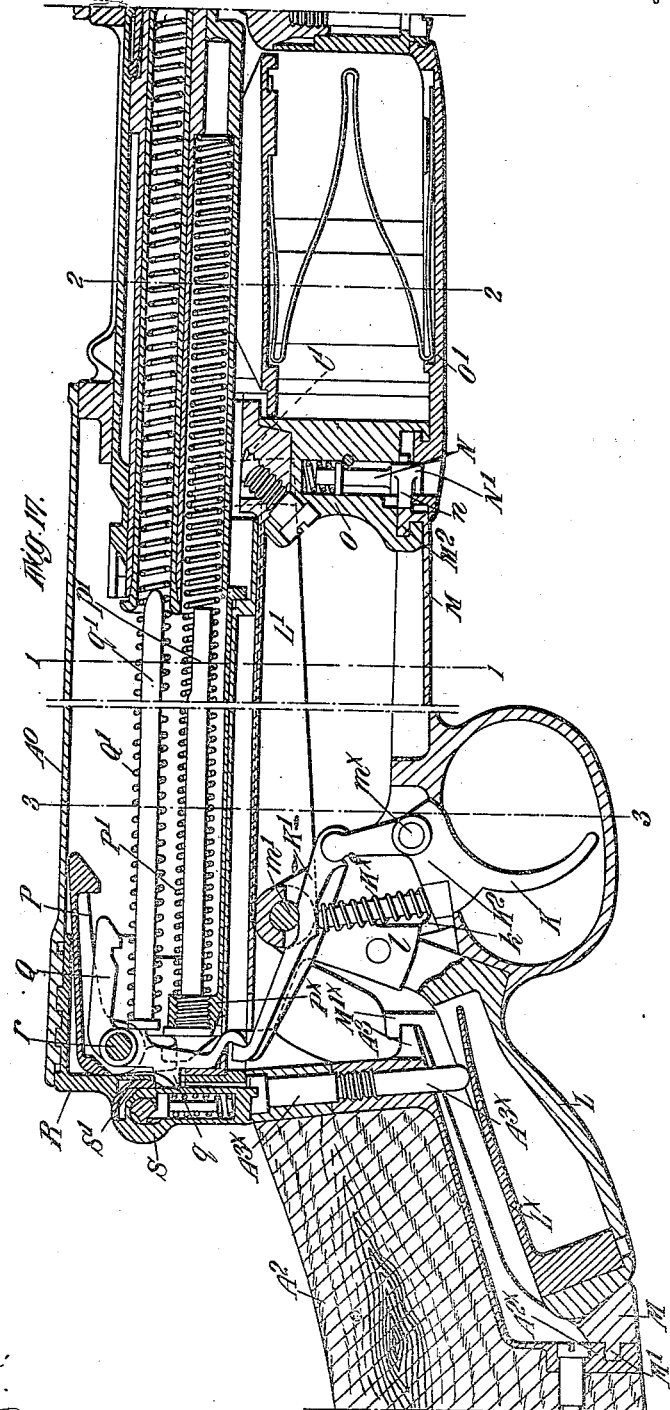

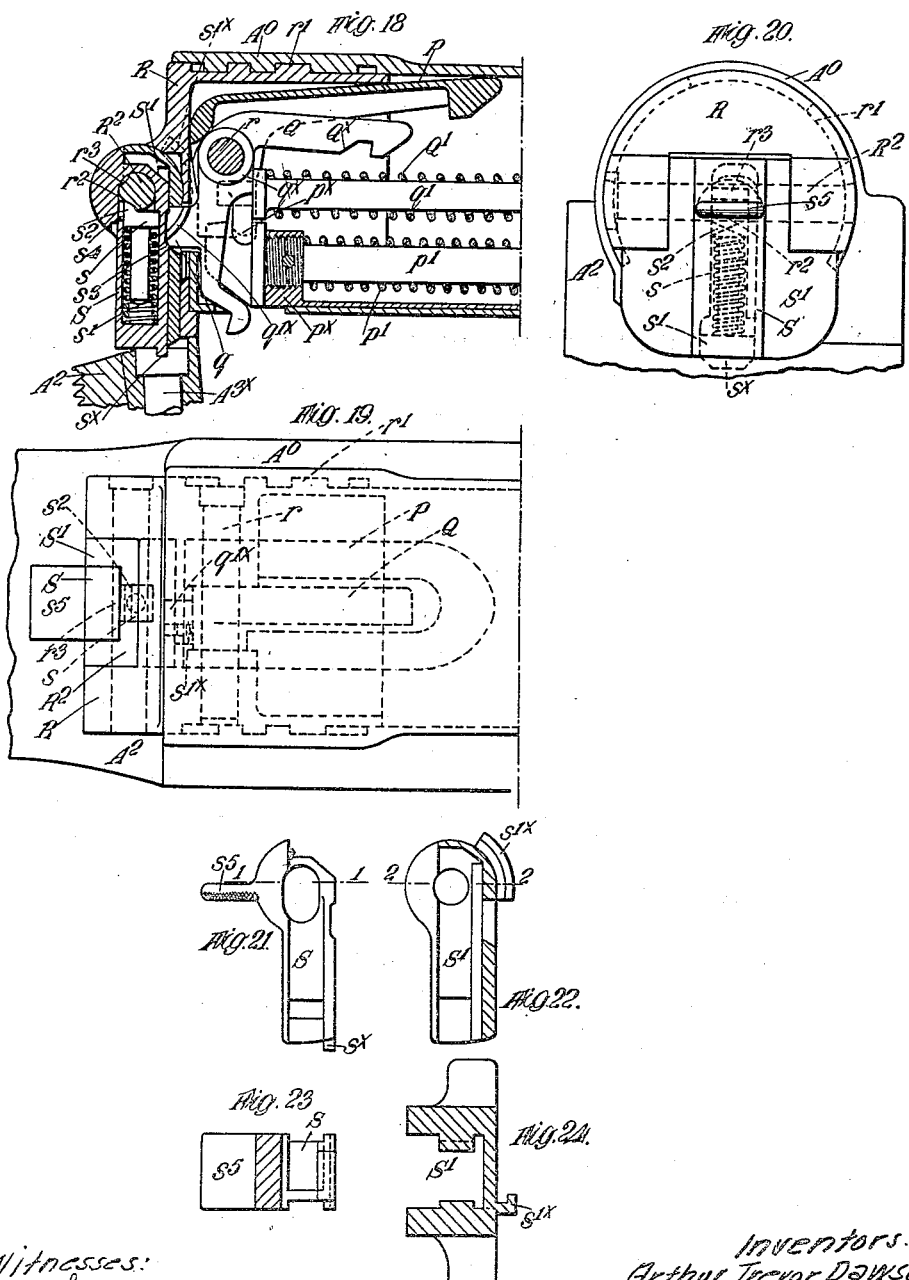

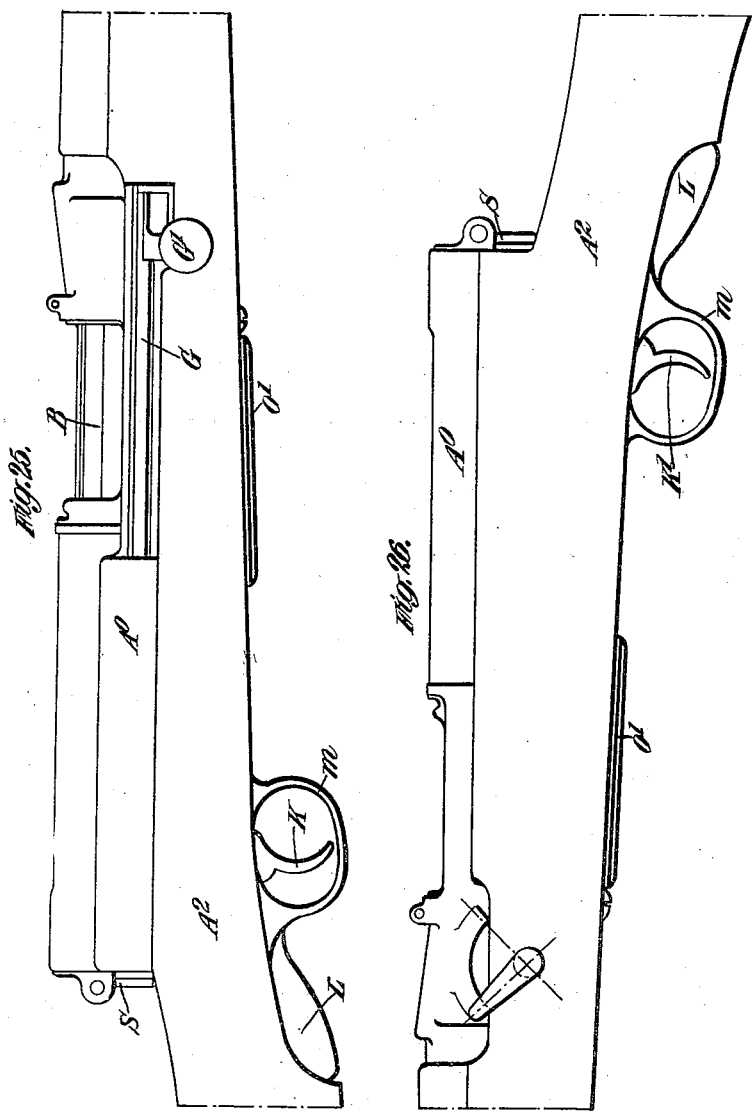

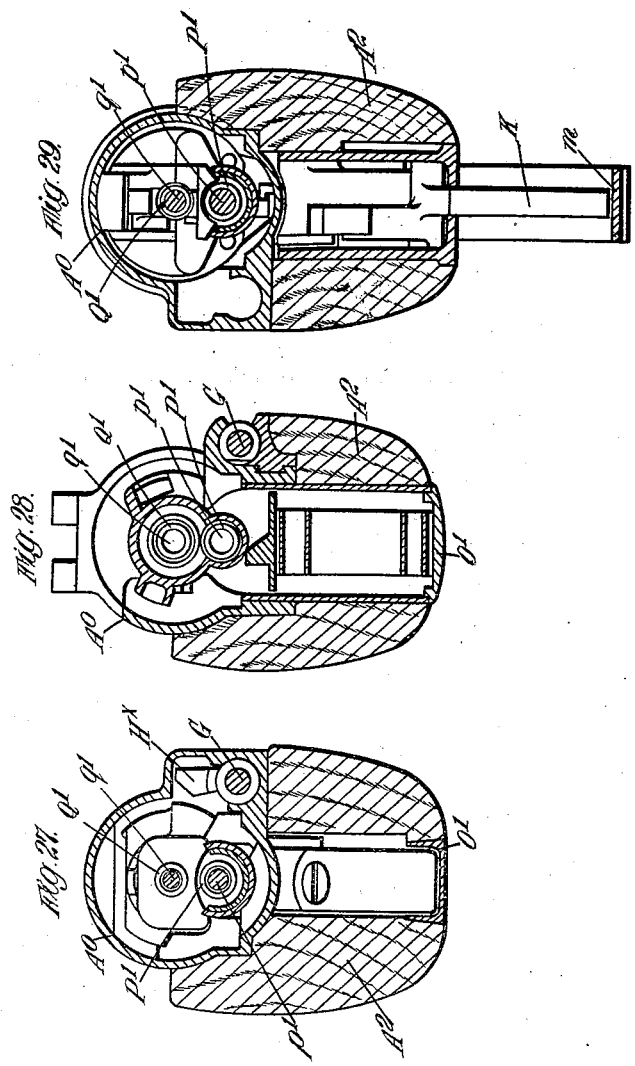

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

FIREARM.

1,077,873.  Specification of Letters Patent.  Patented Nov. 4, 1913.

Application filed May 13, 1913. Serial No. 767,266.

*To all whom it may concern:*

Be it known that we, ARTHUR TREVOR DAWSON, knight, and GEORGE THOMAS BUCKHAM, both subjects of the King of Great Britain, residing at Vickers House, Broadway, Westminster, in the county of London, England, have invented certain new and useful Improvements in or Relating to Firearms, of which the following is a specification.

This invention relates particularly to automatic rifles.

The first portion of the invention has reference to the extractor and consists in detachably carrying it by the bolt head, and detachably retaining it in position by a spring composed of a ring of metal which is split or formed with a transverse gap so that not only can the ring be readily expanded when being placed in position or removed, but it also provides the extractor with the resiliency required for enabling it to engage with the rim of the cartridge.

According to another portion of the invention the fire arm is provided in addition to the barrel recoil spring, with a buffer spring which is composed of a helically slotted tube which surrounds the barrel recoil spring for a portion of its length, the helical slot being preferably of greater pitch than that of the convolutions of the barrel recoil spring.

The third portion of the invention relates to the device (termed the hand slide) employed in automatic rifles for operating the breech bolt when the rifle is employed as an ordinary hand loading rifle. According to this invention the said hand slide is in the form of a longitudinally sliding rod or bar carrying a spring controller member or head which is adapted to be angularly displaced by its spring about a longitudinal axis in order to engage with a part of the sleeve of the breech bolt so that the latter can be operated by the said hand slide, whatever position the bolt may occupy.

We also employ a device which, when the hand slide is in its forward position, will automatically move the aforesaid member or head out of the path of recoil of the part of the breech bolt sleeve with which the said head or member engages. By this means there is no possibility of the hand slide, when it has moved forward, being left in a position such that its member or head would be fouled by the sleeve of the breech bolt when the firearm is firing automatically.

Another portion of the invention relates to trigger mechanism of the kind that is mounted on a detachable plate so that these parts can be placed in and removed from the rifle as an independent unit. According to this invention the said plate is provided at its front and rear ends with ribs or projections which slidably fit into corresponding recesses in the magazine wall and the stock, the said plate carrying in addition to the trigger mechanism, a safety lever that coöperates with the trigger mechanism for normally holding it inoperative.

A further portion of the invention has for its object to provide improved means whereby the breech bolt and its spring and the firing pin and its spring can be removed from the rifle as an integral unit, without the necessity of dismantling any of the other parts of the rifle.

According to this invention the sear and the pawl that retains the bolt in the retracted position are mounted on a plate detachably secured to the casing of the fire arm and normally locked in position by means of a catch device which is of such a character that it cannot be moved into the unlocked position to permit the said plate to be removed unless the sear is raised by the flange of the firing pin, that is to say, until the firing pin and the breech bolt are in their fully retracted positions. The said catch device is also so constructed and arranged that when it is moved into its locked position, the sear is positively prevented from being moved out of engagement with the firing pin, so that the firing pin is prevented from being accidentally released during the removal of the parts.

In order that the said invention may be more clearly understood and readily carried into effect, we will proceed to describe the same more fully with reference to the accompanying drawings in which:—

Figure 1 is a longitudinal section showing the improved extractor applied to an automatic rifle, and Fig. 2 is a transverse section taken approximately on the line 1—1 of Fig. 1. Fig. 3 is a longitudinal section of a rifle showing our improved buffer spring, Fig. 4 is a longitudinal section, Fig. 5 a rear elevation, and Fig. 6 a section on the line 1, 1 of Fig. 4, showing a constructional form of the improved hand slide. Figs. 7, 8, 9 and 10 are respectively a front elevation, a side elevation, a rear elevation, and a plan on an enlarged scale, of the aforesaid spring controlled movable head detached from the rifle. Figs. 11, 12 and 13 are side elevations showing a constructional form of the aforesaid device for automatically moving the handslide out of engagement with the bolt sleeve; in these three figures the handslide is shown fully withdrawn, about to be moved out of engagement, and actually moved out of engagement respectively. Fig. 14 is a section taken approximately on the line 2. 2 of Fig. 12. Fig. 15 is a section taken approximately on the line 3. 3 of Fig. 14 and Fig. 16 is a section taken approximately on the line 4. 4 of Fig. 13. Fig. 16$^a$ is a view similar to Fig. 12 and Fig. 16$^b$ is a section on the line 5. 5 of Fig. 16$^a$, showing another constructional form of the said device. Fig. 16$^c$ is a view similar to Fig. 13 and Fig. 16$^d$ is a section on the line 6. 6 of Fig. 16$^c$ showing the construction of Figs. 16$^a$ and 16$^b$ in another position. Fig. 17 is a longitudinal section of a rifle showing the improved detachable plate carrying the trigger mechanism and the safety lever. Fig. 18 is a longitudinal section. Fig. 19 a plan, and Fig. 20 an end elevation showing a constructional form of the means for enabling the breech bolt, its spring, the firing pin and its spring to be removed as an integral unit. Figs. 21 and 22 are elevations of important parts of the invention, Fig. 22 being in section. Figs. 23 and 24 are sections taken on the lines 1—1 and 2—2 of Figs. 21 and 22 respectively. Figs. 25 and 26 are side elevations viewed respectively from the right and from the left showing a portion of an automatic rifle provided with our herein described improvements. Figs. 27, 28 and 29 are transverse sections taken approximately on the lines 1. 1 2. 2 and 3. 3 of Fig. 17, Figs. 27 and 28 being viewed from the rear, and Fig. 29 from the front.

A is the rifle barrel, A′ the barrel extension, A$^2$ the stock of the rifle, A° the casing of the rifle, B the bolt sleeve and B′ the bolt head.

Referring more particularly to Figs. 1 and 2 C represents the extractor formed with an extracting groove $c$, and D represents the aforesaid ring which is herein referred to as the spring ring.

In the example shown, the extractor C is disposed in a recess or keyway $b′$ in the bolt head B′ and is formed at its rear end with an upwardly projecting toe-piece C′ which engages in a helical groove $b$ in the interior of the bolt sleeve B. The extractor may also be provided on its under surface with a projection C$^2$ which engages in a recess $b'^x$ in the bolt head. The front portion of the extractor that serves as one of the walls of the extracting groove $c$ is inclined as shown in Fig. 1 to enable it to ride over the head of the cartridge in the chamber of the barrel, so as to permit the extracting groove to engage therewith. The rear part of the extractor is formed with an inclined lower surface $c'$; the junction of this inclined surface with the flat surface in contact with the recess or keyway $b′$ constitutes the fulcrum about which the extractor rocks when the extracting groove is about to engage with the head of a cartridge, it being understood that when this operation is being performed the bolt sleeve is in its rearmost position with the toe-piece C′ at the forward end of the groove $b$. The extractor is in the example shown, formed on its upper surface at a point approximately half way between the toe-piece C′ and the extractor groove $c$ with a hemi-spherical projection C$^x$ which is adapted to engage in a similarly shaped recess in the spring ring D. This ring is disposed between the forward end of the bolt sleeve B and the rear surfaces of the locking lugs on the bolt head B′. The ring is split as aforesaid to enable it to be expanded and removed.

The removal of the extractor is effected by drawing the bolt sleeve B rearwardly as far as the toe-piece C′ will permit and depressing the rear portion of the extractor about its aforesaid fulcrum; the toe-piece C′ is then free of the groove $b′$ so that by shifting the bolt sleeve farther to the rear the extractor can be lifted out of position after the ring D has been removed. It will be seen that, as hereinbefore stated, the ring D, in addition to retaining the extractor in place, also serves as a spring to normally hold it in the position shown in Fig. 1.

Referring more particularly to Fig. 3, E is the barrel recoil spring and E′ its guide rod. F represents the buffer spring. The buffer spring is constructed from a tube of steel or other suitable material in which one or more helical slots F′ are cut, the pitch of these slots being as aforesaid greater than that of the convolutions of the barrel recoil spring E. These slots do not extend to the ends of the tube, with the result that a square contacting face is obtained at each extremity. The said buffer spring is formed at its rear with an internal flange $f$ which bears against the forward surface of the head $e'$ of the guide rod E′. The barrel recoil spring E is arranged within the buffer spring F and its rear end is in contact with the forward surface of the flange $f$ of the buffer spring. The length of the buffer spring is preferably, as shown, approximately half that of the barrel recoil spring; a collar E$^x$ attached to the barrel A is adapted to engage with the forward end of the buffer spring if the recoil movement of the barrel should be greater than usual. The said buffer spring is capable of exerting great power of resistance and by reason of the fact that it is arranged concentrically around the barrel recoil spring, conduces to economy of space. Furthermore the long pitch helical coils of the buffer spring formed by the slots F′ prevent any possibility of the barrel recoil spring becoming entangled with the buffer spring.

Referring to Figs. 4 to 16$^a$, G is the hand slide and G′ its operating handle. H represents the aforesaid movable member or head, and H′ its spring. In the example shown, the hand slide G is in the form of a cylindrical rod and is recessed or made hollow as shown in Fig. 4 to receive at its forward part a plug h′ which is detachably secured in position by means of a pin and slot arrangement, and carries one end of the spring H′. This spring is of the flat torsion type and its rear end is connected to a stem h of the aforesaid member or head H. This member or head is provided with a lateral extension H$^x$ which is adapted to engage with a lug A$^x$ on the bolt sleeve B. The said lateral extension has a finger piece h$^x$ which is disposed between two projections g, g$^x$ on the hand slide G, which are arranged in different planes so that they engage on opposite sides of the finger piece h$^x$, and serve to positively move the head H when the hand slide is angularly displaced. When the hand slide G is angularly displaced by the handle G′ in an anti-clockwise direction, (when viewed from the rear) the said lateral extension H$^x$ engages behind the lug A$^x$ on the bolt sleeve B, the projection g$^x$ on the hand slide G being then in front of the said lug. By these means the breech bolt can be moved by hand when the rifle is to be used as an ordinary hand loading rifle.

In the event of the breech bolt not properly returning to the firing position when the rifle is working automatically, the hand slide is turned about its axis in an anti-clockwise direction, and is then displaced longitudinally rearward until an inclined face on the lateral extension H$^x$ on the aforesaid member or head H coöperates with a similar surface on the lug A$^x$ of the bolt sleeve. The member or head H is thereby angularly displaced in a clockwise direction against the resistance of the torsion spring H′ until it passes the lug A$^x$, whereupon the spring causes the member or head to be angularly displaced in an anti-clockwise direction so that its lateral extension H$^x$ assumes a position behind the lugs; at the same time the projection g$^x$ on the hand slide bears against the front surface of the lug A$^x$. The said lug is thus disposed between the extension H$^x$ and the projection g$^x$ and the bolt can then be either retracted or moved forward as desired by displacing the hand slide in the required direction.

Referring to Figs. 11 to 16, J represents the aforesaid device that is adapted to automatically move the hand slide out of the path of recoil of the breech bolt sleeve A$^2$. This device is in the form of a spring controlled lever pivoted at its rear end by means of a pin j to the recoil guide J$^x$ or other relatively stationary part of the firearm. This lever receives at its forward end a spring J′. The forward part of the longitudinally sliding bar or rod G of the hand slide is formed at one side of its axis with a longitudinal recess, slot or the like g′ which, when the bar or rod is nearing its forward position, is adapted to engage with the spring controlled lever J. This lever is provided with a curved or inclined projection J$^2$ which, as the hand slide nears its forward position, engages with the recess or slot g′ in the sliding bar or rod G and is thereby rocked about its pivot to compress the spring J′. (See Figs. 12, 14 and 15.) When the handle G′ of the sliding bar or rod is released by the operator (Figs. 13 and 16), the spring J′, through the intermediary of the pivoted lever J, rocks the sliding bar or rod about its axis and moves the head or member H$^x$ carried thereby out of engagement with the lug A$^x$ on the sleeve A$^2$ of the breech bolt. The said spring controlled lever J is preferably arranged as shown beneath the sliding bar or rod G and the recess or slot g′ is formed in the said bar or rod at the inner side of the longitudinal axis thereof.

In the modification shown in Figs. 16$^a$ to 16$^d$, the device J is carried by the forward end of the rod or bar G, and is in the form of a flat spring having an inclined surface on its forward end that is adapted to coöperate with a corresponding surface j$^{xx}$ on the recoil guide J$^x$ when the bar or rod nears its forward position (Figs. 16$^a$ and 16$^b$) to rock the said bar or rod about its axis as aforesaid (Figs. 16$^c$ and 16$^d$).

In Fig. 17 K is the trigger and K′ the trigger bar pivotally connected thereto. L is the safety device which is in the form of a grip lever. M represents the aforesaid detachable plate and m the trigger guard integral therewith. N represents the spring catch for normally retaining the said plate in position.

The detachable plate M carries pins m′, m$^x$ on which the grip lever and the trigger K are pivotally mounted, and the said detachable plate extends to the rear as far as the forward part of the stock and to the front as far as the rear wall of the magazine, as is clearly seen in the drawing. The rear end of the said plate is formed with a rib M' which is adapted to fit into a groove formed in a metal part $A^{2x}$ of the stock $A^2$. An upward extension of the plate M that carries the pin $m'$ on which the grip lever L is pivoted, has a rearward flange $M'^x$ that engages with a projection $A^3$ on the aforesaid metal part $A^{2x}$ of the stock. The forward end of the plate M is provided with a rearwardly extending projection $M^2$ which fits in a groove formed in the rear wall O of the magazine.

The aforesaid catch N for retaining the plate M in position takes the form, in the example shown, of a spring controlled plunger having a lateral projection $n$ which bears against the front end of the plate M. The said plunger is carried by the rear wall O of the magazine and has a head or extension N' which engages in a recess in the rear end of the magazine cover O' to retain the latter in position. By slightly displacing the plunger in an upward direction, (for example by means of the nose of a cartridge) its head or extension N' can be disengaged from the magazine cover O' and the latter can be removed by sliding it rearwardly; by a further displacement of the plunger N, the lateral projection $n$ thereon is moved out of engagement with the plate M, and the latter can then be detached by sliding it in a forward direction.

The trigger mechanism is of the kind already proposed by us, wherein the trigger bar K' is so disposed in relation to a relatively stationary stop (represented by the pin $m'$), that after the trigger has been pulled through the greater portion of its movement in releasing the firing pin, it coöperates with the said stop so that an increased resistance is obtained during the final pull on the trigger in releasing the firing pin; a spring $K^x$ is interposed between the trigger bar K' and a rearward extension $K^2$ of the trigger. The grip lever L is formed with a toe-piece $l$ that normally engages with a part $k$ of the trigger to hold it inoperative, and is also provided with a forward extension L' having a projection $l'$ that is adapted (in the case of an automatic rifle) to engage with the breech bolt to hold it retracted during the recharging of the magazine. The grip lever is provided with a flat spring $L^x$ against which a pin $A^{3x}$ (carried by the metal part $A^{2x}$ of the stock) bears to normally retain the said lever in the safety position shown.

In Figs. 17 and 18 P is the pawl that retains the bolt in the retracted position, and Q is the sear. P' is the bolt spring, and Q' the firing pin spring. R represents the plate upon which the pawl and sear are mounted, and S is the aforesaid catch device. In the example shown, the pawl P and the sear Q are mounted on a pivot pin $r$ carried by the plate R. This plate is formed with interrupted fillets $r'$ which engage with corresponding grooves in the casing $A°$ of the firearm.

The aforesaid catch device S comprises a casing (Figs. 21–23) which is slidably mounted in a carrier S' (Figs. 22 and 24) and is recessed to receive a plunger $s$ and a spring $s'$ which bears against the plunger and the casing. The head of the plunger $s$ is provided with a curved projection $s^2$ adapted to engage with one or other of two recesses $r^2$, $r^3$ formed in a transverse pin $R^2$ carried by the plate R. The lower surface of the casing S is furnished with a rib $s^x$ that is adapted to normally engage in a slot in a screw $A^{3x}$ carried by the stock $A^2$. The said casing has an inclined surface $s^3$ which, when the firing pin is in its forward or fired position, engages with a projection $q$ on the sear Q to prevent the casing from being displaced from the position shown when the firing pin and bolt are in the forward position. When however the bolt is retracted, the movement of the sear Q into engagement with the firing pin slightly rocks the sear, whereupon the said projection $q$ no longer prevents the casing from being lifted to withdraw the rib $s^x$ from its slot in the screw $A^{3x}$. In order that the said casing may be raised, it is provided with a slot $s^4$ (Fig. 18) for the reception of the rim of a cartridge, or with a finger piece $s^5$ (Figs. 19 to 23). After the casing S has been lifted as aforesaid the carrier S' can be angularly displaced and during this movement a curved rib $s'^x$ or the like thereon coöperates with a corresponding rib $q'^x$ on the sear Q in order to positively hold the latter in engagement with the firing pin. During the displacement of the carrier, the projection $s^2$ moves out of engagement with the recess $r^2$ and into engagement with the recess $r^3$, thereby retaining the carrier in its displaced position. The said carrier together with the plate R can then be moved about the axis of the rifle in order to disengage the interrupted threads $r'$ of the plate from the grooves in the casing $A°$, whereupon the plate together with the sear Q, the firing pin and its spring Q', the pawl P, the bolt and its spring P' can be removed intact while the firing pin and the bolt are in the retracted position.

In the example illustrated (Figs. 18 to 24) the breech action to which our improvements are particularly applicable is of the kind heretofore proposed by us, in which the guide rod of the firing pin spring Q' is carried by the downward extension $q^x$ of the sear, so that the spring Q' tends to retain the sear in engagement with the firing pin, and in which the guide rod $p'$ of the bolt return spring is carried by a releasing slide $P^x$ engaging with a projection $p^x$ on the bolt retaining pawl P, the said spring thus tending to hold the pawl in engagement with the bolt.

What we claim and desire to secure by Letters Patent of the United States is:—

1. In a fire-arm, the combination with the bolt and the longitudinal extractor carried thereby, of a rearward extension of said extractor having an inclined lower surface, a hemi-spherical projection on said extractor, and a split ring arranged around the bolt and extractor, and having a recess for the reception of the hemi-spherical projection on the extractor.

2. In an automatic fire-arm, the combination with the recoiling barrel and its recoil spring, of a buffer spring composed of a helically slotted tube that surrounds the recoil spring for a portion of its length.

3. In an automatic fire-arm, the combination with the breech bolt, of a longitudinally sliding member having a slight rotary movement and serving as a hand slide for said bolt, means for imparting rotary movement to said sliding member to return it to normal position after completion of its forward movement, an angularly movable breech block coupling member carried by said sliding member and a spring for controlling the angular movement of said angularly movable member.

4. In an automatic fire-arm, the combination with the breech bolt, of a longitudinally sliding member having a slight rotary movement and serving as a hand slide for said bolt, means for imparting rotary movement to said sliding member to return it to normal position after completion of its forward movement, an angularly movable member carried by said sliding member, a spring for controlling the angular movement of said angularly movable member, a lateral extension and a finger piece on said angularly movable member, and two projections on said longitudinally sliding member between which the finger piece is loosely arranged.

5. In an automatic fire-arm, the combination with the breech bolt, of a longitudinally moving hand slide having a slight rotary movement and adapted to displace said bolt, means for imparting rotary movement to said sliding member to return it to normal position after completion of its forward movement, an angularly movable member associated with said hand slide and means for automatically moving said angularly movable member into the disengaged position as the said slide approximately reaches its forward position.

6. In an automatic fire-arm, the combination with the breech bolt, of a longitudinally sliding member having a slight rotary movement and serving as a hand slide for said bolt, means for imparting rotary movement to said sliding member to return it to normal position after completion of its forward movement, an angularly movable member carried by said sliding member, a spring for controlling the angular movement of said angularly movable member, and means for automatically displacing said angularly movable member into its disengaged position as the longitudinally sliding member approximately reaches its forward position.

7. In an automatic fire-arm, the combination with the breech bolt, of a longitudinally sliding member having a slight rotary movement and serving as a hand slide for said bolt, means for imparting rotary movement to said sliding member to return it to normal position after completion of its forward movement, an angularly movable breech block coupling member carried by said sliding member, a spring for controlling the angular movement of said angularly movable member, a lever pivoted to a relatively stationary part, and a spring for causing said lever to rock the longitudinally sliding member about its axis as it approximately reaches its forward position.

8. In an automatic fire-arm, the combination with the recoiling breech bolt, its spring, the firing pin, its spring, the pawl for engaging with said bolt, and the sear for engaging with said firing pin, of a plate, means for mounting said bolt, firing pin, pawl, sear and springs on the plate, a catch device for detachably connecting said plate in the fire-arm and means for preventing said catch device from being moved into the unlocked position to enable the plate to be removed unless the sear is raised by the firing pin.

9. In an automatic fire-arm, the combination with the recoiling breech bolt, its spring, the firing pin, its spring, the pawl for engaging with said bolt, and the sear for engaging with said firing pin of a plate, means for mounting said bolt, firing pin, pawl sear and springs on the plate, a catch device for detachably connecting said plate in the fire-arm, and means whereby when the said catch device is in the unlocked position the sear is prevented from being moved out of engagement with the firing pin.

10. In an automatic fire-arm, the combination with the recoiling breech bolt, its spring, the firing pin, its spring, the pawl for engaging with said bolt, and the sear for engaging with said firing pin of a plate, means for mounting said bolt, firing pin, pawl, sear and springs on the plate, a catch device for detachably connecting said plate in the fire-arm comprising a pivoted carrier and a spring casing movably mounted in said carrier and having an inclined surface and a projection on said sear adapted to engage with said inclined surface to prevent the casing from being moved to its unlocking position when the firing pin is in its forward position.

11. In an automatic fire-arm, the combination with the recoiling breech bolt, its spring, the firing pin, its spring, the pawl for engaging with said bolt, and the sear for engaging with said firing pin of a plate means for mounting said bolt, firing pin, pawl sear and springs on the plate, a catch device for detachably connecting said plate in the fire-arm comprising a pivoted carrier and a spring casing movably mounted in said carrier, a curved rib on said carrier, and a corresponding rib on the sear, these ribs coöperating to prevent the sear from being actuated when the casing has been moved into its unlocked position.

In testimony whereof we affix our signatures in the presence of two witnesses.

ARTHUR TREVOR DAWSON.
GEORGE THOMAS BUCKHAM.

Witnesses:
HENRY KING,
JNO. R. CASWELL.

Copies of this patent may be obtained for five cents each, by addressing the "Commissioner of Patents, Washington, D. C."